United States Patent [19]

Rietema

[11] 4,059,038

[45] Nov. 22, 1977

[54] ASSEMBLY AND METHOD FOR GUIDING A PORTABLE POWER SAW

[76] Inventor: Simon Petrus Rietema, 638 N. Crestview Drive, Glendora, Calif. 91740

[21] Appl. No.: 684,697

[22] Filed: May 10, 1976

Related U.S. Application Data

[62] Division of Ser. No. 571,140, April 24, 1975, abandoned.

[51] Int. Cl.$^2$ ............................................. B27B 9/04
[52] U.S. Cl. .................................. 83/745; 83/486.1; 83/581
[58] Field of Search .............. 83/745, 743, 574, 581, 83/486.1, 486

[56] References Cited

U.S. PATENT DOCUMENTS

| 2,942,633 | 6/1960 | King | 83/486.1 |
| 3,320,982 | 5/1967 | Kwiatkowski | 83/574 |
| 3,536,112 | 10/1970 | Kordyban | 83/745 |
| 3,830,130 | 8/1974 | Moore | 83/745 |

*Primary Examiner*—Donald R. Schran
*Attorney, Agent, or Firm*—Benoit Law Corporation

[57] ABSTRACT

Assembly and method for guiding a portable power saw to make straight cuts in a workpiece is disclosed in which a reference edge is formed on a guidepiece held by the assembly. The reference edge is preferably formed by guiding the saw along a predetermined cutting path defined by the assembly to trim the guidepiece. To make a straight cut in a workpiece, the assembly is placed thereon with the reference edge defined by the guidepiece aligned along the line the cut is to be made and the power saw is guided by means of the assembly along the predetermined cutting path defined thereby.

13 Claims, 10 Drawing Figures

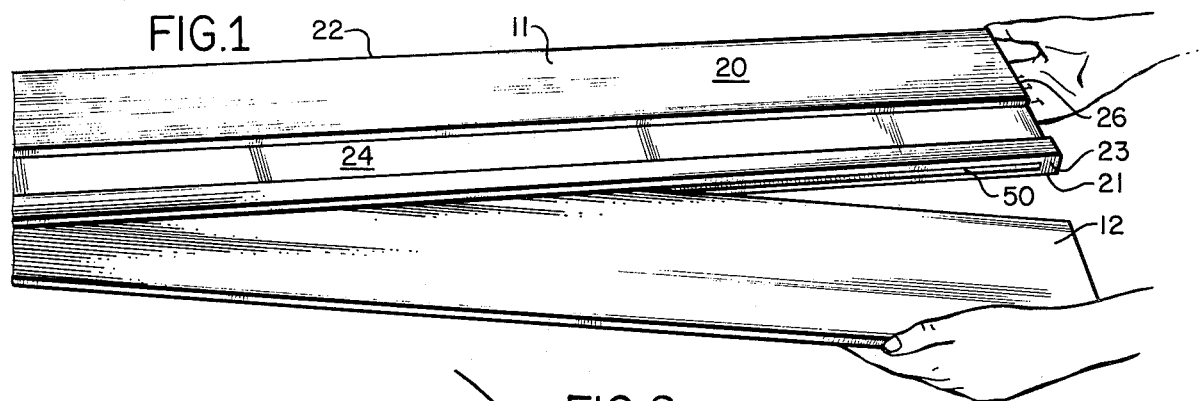
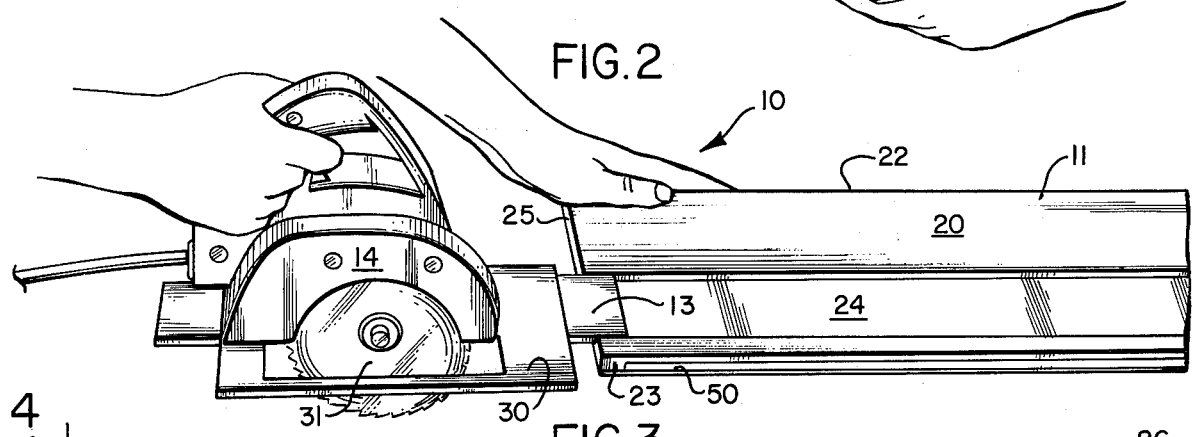
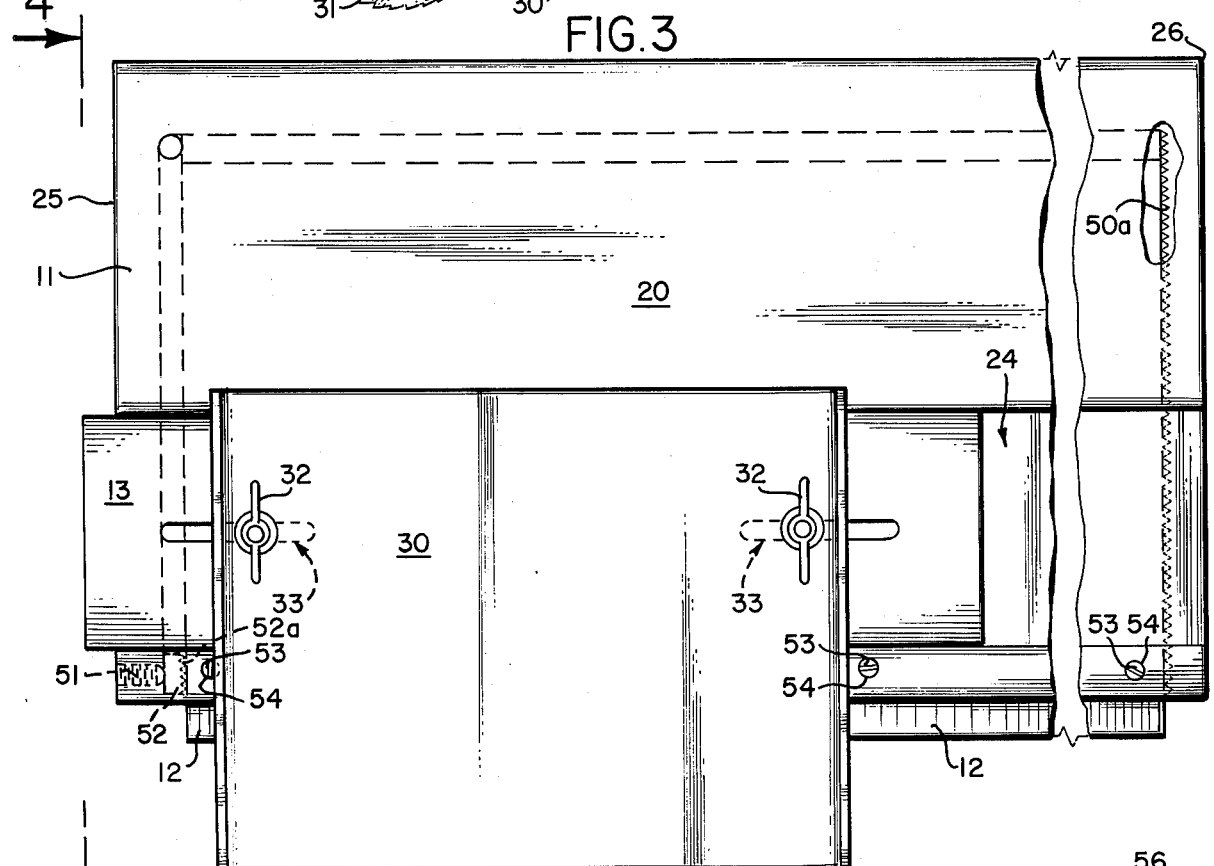
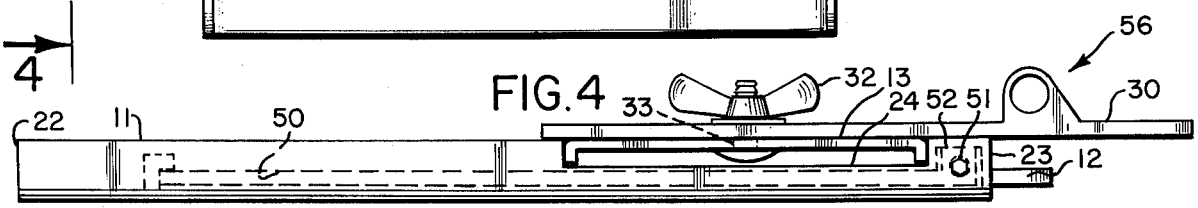

ASSEMBLY AND METHOD FOR GUIDING A PORTABLE POWER SAW

This is a division of application Ser. No. 571,140, filed Apr. 24, 1975, now abandoned

BACKGROUND OF THE INVENTION

The present invention relates to the use of portable power saws.

Portable power saws are operable to effortlessly and rapidly make clean cuts in wood and the like. Accordingly, such power saws are commonly used in the construction of buildings, furniture and other like applications. A disadvantage with the use of portable power saws is that due to the rapidity of their cutting action, once a cut is started there is no easy and safe way to compensate for any misalignment. Further, portable power saws, once energized, represent very dangerous instruments which can kill and dismember if not carefully controlled.

Consequently, it is highly desirable that portable power saws be accurately and safely guided along predetermined cutting paths whenever used in order to avoid the occurrence of serious accidents and the making of improperly aligned cuts.

SUMMARY OF THE INVENTION

It is an object of the present invention to provide an improved assembly and method for guiding a portable power saw to make straight cuts in a workpiece.

It is further an object of the present invention to provide an improved assembly and method for guiding a portable power saw to make straight cuts in a workpiece characterized by employing a cuttable guidepiece which is trimmed to define a reference edge which may be thereafter used to align a predetermined cutting path defined by the assembly with a selected line on a workpiece along which a cut is to be made.

In accomplishing these and other objects of the present invention, there is provided in one embodiment a saw guide assembly formed by housing structure; a planar guidepiece; and a guideplate arranged for securement to the base of a portable power saw. A guide groove for slidably receiving the guideplate is defined along the length of the housing top surface, and the guideplate preferably extends beyond the base of the saw to which it is attached so that the guideplate and groove may be slidably mated prior to movement of the saw into a cutting position.

A slot for receiving the planar guidepiece is defined within the housing to open along one of the longitudinal sides of the housing.

Mechanism is provided for securing the guidepiece in a fixed position in the slot whereat it extends a selected distance therefrom. A reference edge is formed on the guidepiece in alignment with the cutting path defined by the saw guide assembly. This reference edge may be formed by guiding the saw when energized along the predetermined cutting path defined by the saw guide assembly to trim the guidepiece to form a reference edge thereon aligned with the cutting path.

To make a straight cut in a workpiece, the saw guide assembly is placed on the workpiece with the reference edge formed on the guidepiece aligned along the line the cut is to be made, and the power saw is guided by means of the saw guide assembly along the predetermined cutting path defined thereby. The saw may be repeatably guided along this predetermined cutting path of movement by sliding the guideplate through the guide groove.

In another embodiment provided, the saw guide assembly has a selectively positionable guide bar mounted on its housing top surface instead of a guide groove formed therein. By sliding the portable power saw along the housing top surface, with the baseplate of the saw riding against the guide bar, a reference edge may be cut on the planar guidepiece. The power saw may be used with this embodiment of saw guide assembly to make a straight cut in a workpiece by aligning the reference edge formed on the guidepiece with the line along which the cut is to be made and sliding the power saw along the housing top surface with the saw baseplate riding against the guide bar. Additional objects of the present invention reside in the construction of the embodiments of saw guide assembly hereinafter described in conjunction with the several drawings as well as in their method of operation.

BRIEF DESCRIPTION OF THE DRAWINGS

FIGS. 1 and 2 are perspective views illustrating a saw guide assembly according to the present invention along with an associated portable power saw.

FIG. 3 is a top plan view of the saw guide assembly of FIGS. 1 and 2 with the power saw itself removed from its baseplate to illustrate the arrangement securing an associated guideplate to the saw baseplate.

FIG. 4 is a view takne along line 4—4 of FIG. 3.

DETAILED DESCRIPTION OF THE PREFERRED EMBODIMENTS

Figure 5:
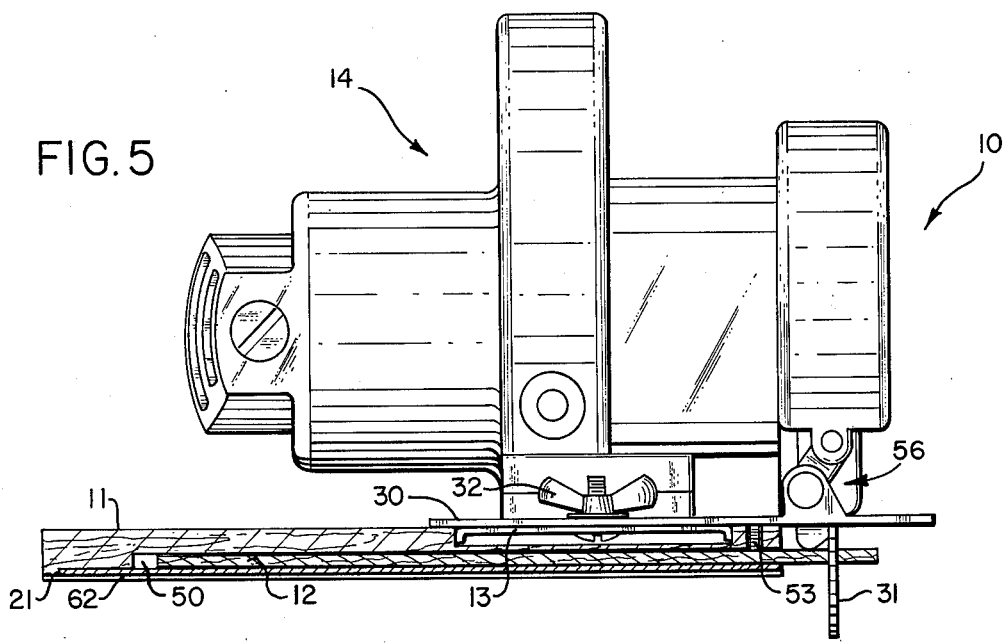
FIG. 5 is an end elevation view of the saw guide assembly of FIGS. 1 and 2 illustrating the cutting of a planar guidepiece to define a reference edge.
Figure 6:
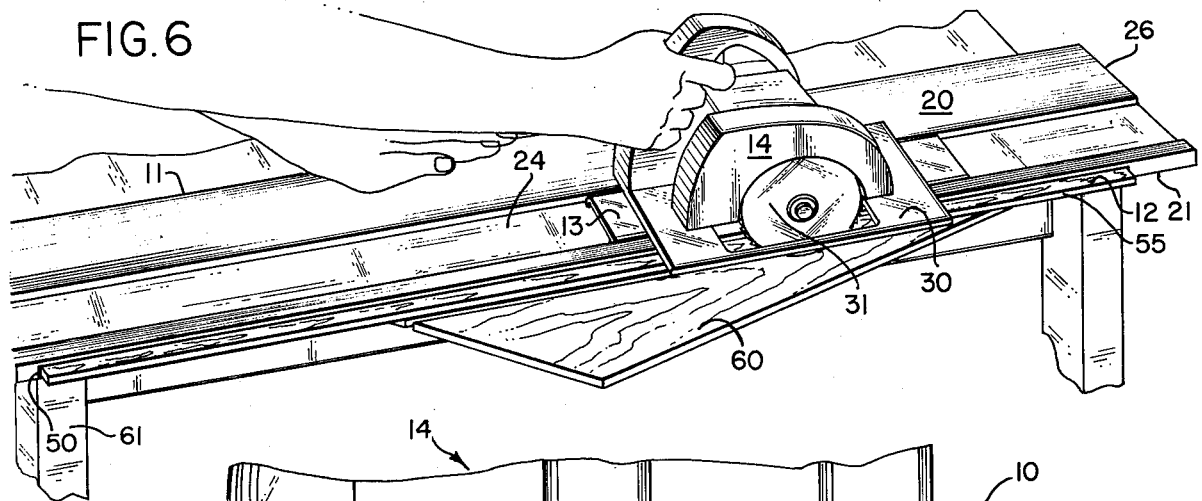
FIGS. 6 and 7 are, respectively, perspective and end elevation views of the saw guide assembly of FIGS. 1 and 2, illustrating the use thereof in making a straight cut in a workpiece.
Figure 7:
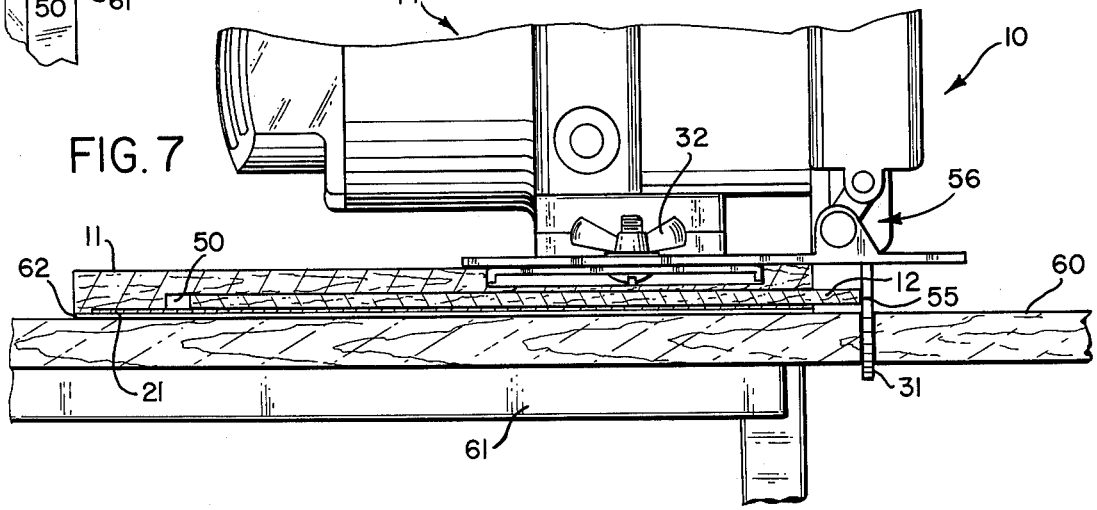

Referring to the drawings in more detail, there is shown in FIGS. 1-7 a saw guide assembly generally identified by the numeral 10. The saw guide assembly 10 is formed by housing structure 11; a planar guidepiece 12; and a guideplate or slide 13 arranged for securement to the base of a portable power saw 14.

The housing structure 11 has top surface 20, bottom surface 21, and longitudinally extending side edges 22 and 23. The housing 11 may be formed of any suitable material, such as plastic, and preferably is of a substantially flat, rectangular shape. A uniformly shaped guide groove 24 is defined along the length of the housing 11 between its ends 25 and 26. The guide groove 24 has open ends, preferably a substantially U-shaped cross section, and extends parallel and adjacent to the housing longitudinally extending side edge 23.

The guide groove 24 is dimensioned for slidably receiving the guideplate 13 mounted on the portable power saw 14. The guideplate 13 is a longitudinally extending rectangularly shaped substantially planar member having a substantially U-shaped cross section.

The guideplate 13 is secured on the baseplate 30 of the power saw 14 to extend forwardly and rearwardly a predetermined distance therefrom with its U-shaped cross section in inverted relationship to the guide groove 24. The guidelate 13 is secured on the powr saw baseplate 30 in a substantially parallel disposition to the longitudinal axis of the power saw 14 and is appropriately positioned laterally thereon so that with the guideplate 13 slidably mated with the guide groove 24, the circular saw blade 31 is positioned a predetermined distance outside of the longitudinal housing edge 23.

The guideplate 13 may be secured to the saw baseplate 30 in any suitable manner. One suitable manner is shown in FIGS. 1–7. As there shown, wing nuts 32 are secured through aligned holes and slots 33. The holes and slots are located respectively in the saw baseplate 30 and the guideplate 13.

Figure 8:
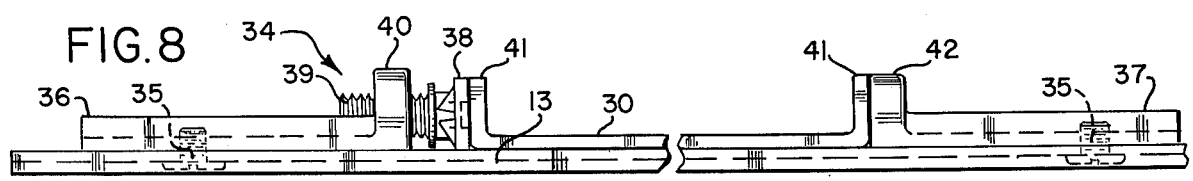
FIG. 8 is a side elevation view of an alternate arrangement for securing a guideplate on the baseplate of the portable power saw of FIG. 2.

Another suitable method for securing the slide 13 on the saw baseplate 30 is shown in FIG. 8. As there shown, adjustable clamp structure, generally identified by the numeral 34, is secured by screws 35 to the guideplate 13. The adjustable clamp structure 34 is made up of fixedly positioned pieces 36 and 37, which are held in place by the screws 35, and moveable clamp member 38. Clamp member 38 may be selectively advanced toward or away from the saw baseplate 30 by turning in the appropriate sense the screw 39 threaded through the upwardly extending portion 40 of the member 36.

In operation, the saw guideplate 13 is secured on the saw baseplate 30 by turning the screw 39 to advance the clamp 38 against the adjacent upturned edge 41 of the saw base 30. Thereby, clamp 38 along the the stop 42 formed on the fixed member 37 operate to hold the guideplate 13 clamped in place on the saw baseplate 30 against the baseplate upturned edges 41.

A slot 50 for receiving the planar guidepiece 12 is defined within the housing 11 to open along housing longitudinal side 23. The slot 50 is defined as a rectangular cavity which has a depth dimension extending transversely to the housing 11 and substantially equal to housing width. The guidepiece insert 12 may be made of any suitable material, preferably masonite, and is a rectangularly shaped member appropriately dimensioned for being fitted within the slot 50. As seen in FIGS. 1 etc., the guidepiece insert 12 is free of the saw guiding means 24 or 63.

In FIG. 1, the guidepiece 12 is illustrated being inserted in the slot 50. The guidepiece 12 is inserted in the slot 50 to extend from the housing side edge 23 a predetermined distance and is clamped in place by tightening clamping mechanism. Clamping mechanism is shown in FIGS. 3 and 4 in the form of a screw 51 which may be tightened to force the corrugations 52a on a moveable member 52 against one of the end edges of the guidepiece 12. Corrugations 50a are formed on the opposite housing side edge defining the slot 50. Screw 51, when tightened, exerts a pressure on corrugated moveable member 52 to press the corrugations 52a thereof against guidepiece insert 12. Insert 12, in turn, presses against the corrugated innerside 50a of housing 11.

As a result of these actions, insert 12 is firmly locked in place. Additionally, as shown in FIGS. 3 and 5, screws 53 may be tightened in holes 54 as an added clamping mechanism to bear down on the top surface of the guidepiece 50, thereby to clamp it tightly in place. The inclusion of the screws 53 with their associated holes 54 may not be desired in all instances, and accordingly may be omitted as appropriate.

The guidepiece 12 is clamped in place in the slot 50 with its outer edge extending across the predetermined cutting path defined by the saw guide assembly 10. Thereby, by moving the power saw 14 along this predetermined cutting path by sliding the guideplate 13 through the guide groove 24, the guidepiece insert 12 is cut to define a reference edge 55. The cutting of this reference edge is shown in FIG. 5. It is noted that prior to cutting the reference edge 55 the angular orientation of the power saw blade 31 should be properly set by means of the angular adjustment mechanism 56 contained on the power saw 14.

Once the guidepiece 12 has been cut to define the reference edge 55, the assembly 11 is positioned on a workpiece 60 to be cut with reference edge 55 aligned along the selected line on the workpiece 60 along which a cut is to be made. The assembly 11 is shown so positioned in FIG. 6 making a cut in the workpiece 60. The workpiece 60 is positioned on a work table 61 and the housing 11 is positioned on the workpiece 60.

It is noted to prevent slippage of the housing 11 during the cutting of the reference edge 55 or the making of a straight cut on a workpiece that a non-slipping material 62, such as natural cork or neoprene cork, is secured on the lower surface 21 of the housing structure 11.

Also, it is noted to permit accurate alignment of the reference edge 55 with a line along which a straight cut is to be made that the distance between the reference edge 55 and the bottom surface of the housing 11 should be as small as possible. Further, it is desirable that the reference edge 55 extend, as illustrated, substantially the entire length of the housing 11 so as to fully utilize the length of the assembly housing 11.

Thus, an assembly and method has been provided for making straight cuts on a workpiece. It is noted that the straight cuts may be made on the workpiece 60 independently of the outer peripheral edges of the workpiece, that is to say the outer peripheral edges of the workpiece are not needed as references. The line on which the straight cut is to be made in the workpiece 60 may be scribed thereon or simply indicated thereon by two points. The guidepiece reference edge 55 is aligned along this line where the cut is to be made and the power saw is guided by the saw guide assembly 10 in the manner illustrated in FIG. 7 to make a straight cut.

Figure 9:
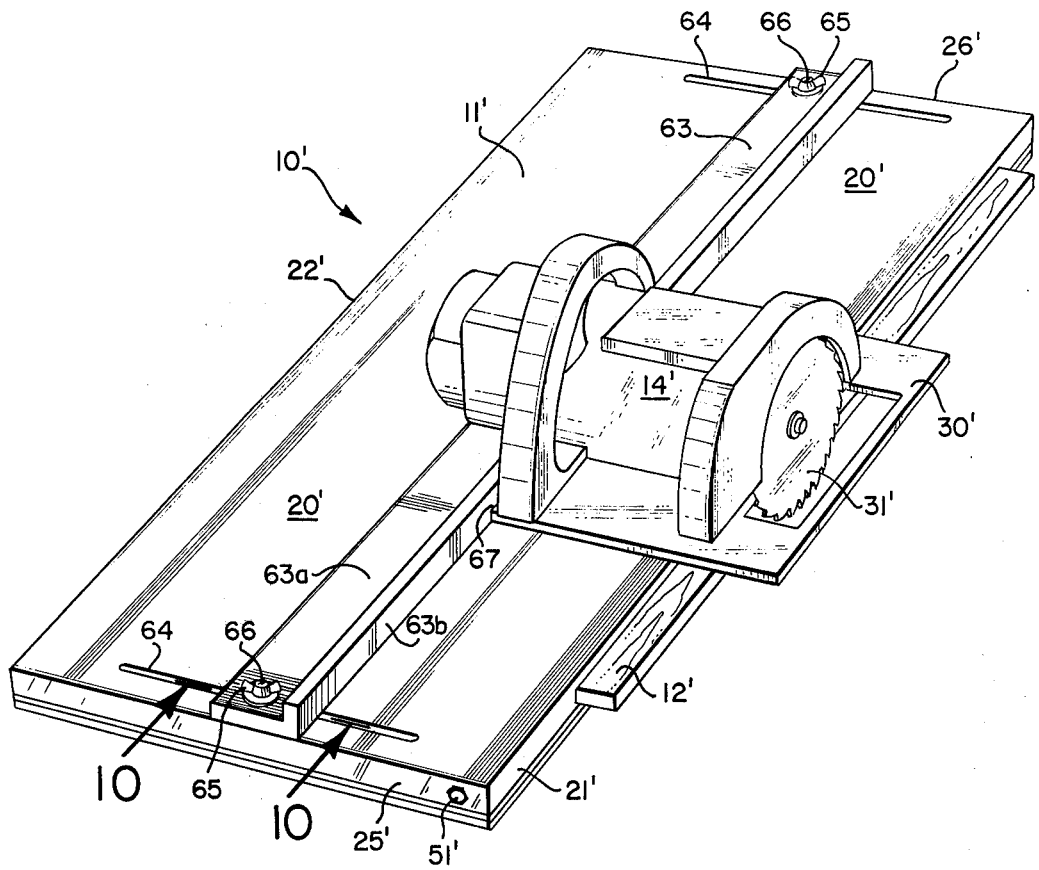
FIG. 9 is a perspective view of another embodiment of saw guide assembly according to the present invention.
Figure 10:
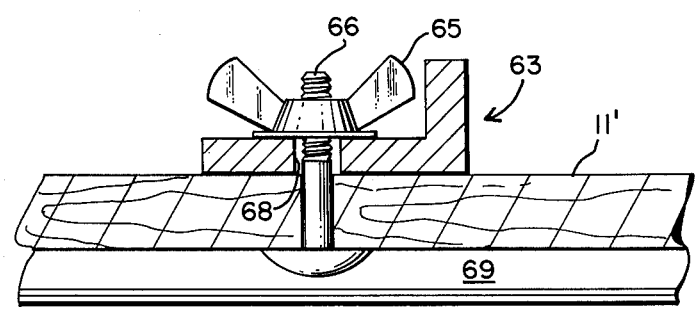
FIG. 10 is a view taken along the line 10—10 of FIG. 9.

Referring to FIGS. 9 and 10, another embodiment of saw guide assembly 10' is there shown associated with portable power saw 14'. The assembly 10' and saw 14' are generally similar in construction and operation to the above-described assembly 10 and saw 14. Accordingly, corresponding parts of each are identified by the same numerals used in FIGS. 1–8 with a prime added.

The assembly 10' differs from the assembly 10 by having a selectively positionable guide bar 63 for guiding the path of movement of the power saw 14' instead of the above-described guide groove 24 and cooperating guide plate 13. The guide bar 63 is straight longitudinal member dimensioned to extend from one end 25' of the housing 11 to its other end 26'. The bar 63 preferably has a right angled cross-section made up of mutually perpendicular portions 63a and 63b. The bar 63 is shown positioned with its portion 63a resting on the housing top surface 20'and its portion 63b positioned towards the housing edge 21'. The portion 63b defines a guide surface which extends upwardly in a substantially parallel disposition to the housing edge 21'.

A transversely extending guide bar adjustment slot 64 is formed through the surface 20' of the housing 11' adjacent each end thereof. The slots 64 extend parallel to the housing edges 25', 26' and open in cavities or openings 69 formed by the housing 11. Fastening means in the form of wing nuts 65 and bolts 66 are employed to secure the guide bar 63 in place on the housing surface 20'.

The bolts 66 extend upwardly through the slots 64 into and through holes 68 formed in the ends of the guide bar portion 63a. By threading the wing nuts 65 on the bolts 66 and tightening them thereon, the guide bar 63 may be selectively clamped or secured in the position in which it is adjusted on the housing 11'.

With the guide bar 63 clamped in a fixed position, and the guidepiece insert 12' secured in place, the saw 14' may be used to cut a reference edge on the insert 12' by guiding the saw baseplate 30' along the housing surface 20' with the straight baseplate inner edge 67 riding against the straight guide bar portion 63b. Once the reference edge is cut on the insert 12', the housing 11' may be used with the saw 14' in the manner hereinbefore described to make straight cuts on a workpiece.

It is noted that the specific power saw used with the assemblies 10 or 10' may be changed. However, each time the power saw used is changed or the angle of its blade is changed, a new reference edge should be trimmed on the guidepiece 12 or 12'. It is also noted that instead of cutting or trimming the guidepiece to form the reference edge that in instances the reference edge thereon could be formed by inserting the guidepiece in the slot 50 or 50' and then adjusting its position outwardly therefrom to a location where its outer edge lies parallel to and a selected distance apart from the path of travel of the saw blade. Clamping the guidepiece in such a position would clamp its outer edge in a reference position so that its outer edge could be used as a reference edge.

A shim could be used between the saw blade and the outer edge of the guidepiece when setting the reference edge in this manner. It is noted that each time the guidepiece is retrimmed in order to define a new reference edge very little of the material need be used. Further, by making the guidepiece of a relatively durable material, such as masonite, the guide edge may be used over and over again for a considerable period of time without being substantially damaged.

Although the invention has herein been shown and described in what is conceived to be the most practical and preferred embodiments, it is recognized that departures may be made therefrom within the scope of this invention.

I claim:

1. A saw guide assembly, comprising:
   housing structure;
   means associated with said housing structure for guiding an associated power saw along said housing structure in a straight path with the saw blade of said power saw moving along a predetermined straight cutting path alongside said housing structure;
   a guidepiece having a longitudinal dimension for alignment along said straight cutting path, said guidepiece being made of a material cuttable by said power saw to define a reference edge;
   said housing structure having a slot for slidably receiving said guidepiece, with said guidepiece extending transversely from said housing structure; and
   means associated with said housing structure for holding said guidepiece in a fixed position on said housing structure with the longitudinal dimension of said guidepiece substantially aligned with said cutting path, said holding means being adjustable to selectively position said guidepiece across said cutting path whereby by making a cut along said cutting path with said power saw said guidepiece may be trimmed along its longitudinal dimension to define a reference edge aligned with said cutting path usable for positioning said saw guide assembly on a workpiece.

2. The invention defined in claim 1 wherein said means for guiding an associated power saw along said housing structure in a straight path comprises a guide groove and mating guide structure.

3. The invention defined in claim 2, wherein:
   said guide groove is formed in the upper surface of said housing structure to extend longitudinally therealong; and
   said mating guide structure is securable to the base of said associated power saw in a predetermined position relative to the saw blade of said power saw.

4. The invention defined in claim 3, wherein:
   said guide groove has a substantially U-shaped cross-section; and
   said mating structure is a planar member having a substantially U-shaped cross-section in inverted relationship to said guide groove.

5. The invention defined in claim 4, wherein:
   said guide groove is open on its ends; and
   said mating guide structure extends forwardly and rearwardly beyond the base of said associated power saw to ensure proper guidance of said associated power saw during insertion and removal of said guide structure into and from said guide groove.

6. The invention defined in claim 1, wherein:
   said slot in said housing structure is of predetermined depth for receiving said guidepiece; and
   said means for holding said guidepiece in a fixed position are clamping means having corrugated clamping surfaces.

7. A saw guide assembly, comprising:
   housing structure having substantially flat parallel upper and lower surfaces and longitudinally extending side edges;
   means associated with said housing structure for guiding an associated power saw along said housing structure in a straight path with the saw blade of said power saw moving along a predetermined straight cutting path alongside said housing structure;
   a guidepiece having a longitudinal dimension, said guidepiece being made of a material cuttable by said power saw to define a reference edge;
   said housing structure defining a slot of predetermined depth for receiving said guidepiece, said slot being a planar cavity opening in one of the longitudinal side edges of said housing structure, said slot being defined substantially parallel to said upper and lower surfaces of said housing structure and having its depth dimension extending transversely across said housing structure;
   said guidepiece being a planar member dimensioned for positioning in said slot to extend transversely from said housing structure; and means associated with said housing structure including clamping means having corrugated clamping surfaces for holding said guidepiece in a fixed position on said housing structure with the longitudinal dimension of said guidepiece substantially aligned with said cutting path, said holding means being adjustable to selectively position said guidepiece across said cutting path whereby by making a cut along said cutting path with said power saw said guidepiece may be trimmed along its longitudinal dimension to define a reference edge aligned with said cutting path usable for positioning said saw guide assembly on a workpiece.

8. The invention defined in claim 7, wherein said means for guiding an associated power saw along said housing structure in a straight path comprises:
a guide groove formed in the upper surface of said housing structure to extend longitudinally therealong, said guide groove having a substantially U-shaped cross-section and being open on its ends; and
mating guide structure, said mating guide structure being securable to the base of said associated power saw in a predetermined position relative to the saw blade of said power saw, said mating guide structure being a planar member having a substantially U-shaped cross-section in inverted relationship relative to said guide groove which extends forwardly and rearwardly beyond the base of said associated power saw to ensure proper guidance of said associated power saw during insertion and removal of said guide structure into and from said guide groove; and wherein:
the lower surface of said housing structure is formed as a non-slipping surface to prevent slippage of said assembly on a workpiece or work table.

9. The invention defined in claim 1, wherein said means for guiding an associated power saw along said housing structure in a straight path comprises a selectively positionable guide bar mounted on said housing structure.

10. The invention defined in claim 9, wherein said guide bar is mounted on said housing structure by means of fasteners which may be selectively tightened to secure said guide bar in a fixed position thereon, said housing structure having guide bar adjustment slots formed therein, said fasteners being associated with and selectively movable along said adjustment slots to permit selective positioning of said guide bar on said housing structure.

11. A saw guide assembly, comprising:
means for repeatably guiding an associated power saw along a straight cutting path;
a guidepiece having a longitudinal dimension for alignment along said straight cutting path; and
means for holding said guidepiece in a fixed aligned position with said cutting path to define a reference edge aligned with said cutting path usable for positioning said saw guide assembly on a workpiece, said holding means being adjustable to selectively position said guidepiece across said cutting path whereby by making a cut along said cutting path with said power saw said guidepiece may be trimmed along its longitudinal dimension to define a reference edge aligned with said cutting path usable for positioning said saw guide assembly on a workpiece;
said means for guiding an associated power saw being located on said means for holding said guidepiece and said guidepiece being free of said means for guiding an associated power saw.

12. A saw guide assembly, comprising:
housing structure having substantially flat parallel upper and lower surfaces and longitudinally extending side edges;
means associated with said housing structure for guiding an associated power saw along said housing structure in a straight path with the saw blade of said power saw moving along a predetermined straight cutting path alongside said housing structure;
a guidepiece having a longitudinal dimension, said guidepiece being made of a material cuttable by said power saw to define a reference edge;
said housing structure defining a slot of predetermined depth for receiving said guidepiece, said slot being a planar cavity opening in one of the longitudinal side edges of said housing structure, said slot being defined substantially parallel to said upper and lower surfaces of said housing structure and having its depth dimension extending transversely across said housing structure;
said guidepiece being a planar member dimensioned for positioning in said slot to extend transversely from said housing structure; and
means associated with said housing structure for releasably holding said guidepiece in a fixed position on said housing structure with the longitudinal dimension of said guidepiece substantially aligned with said cutting path, said holding means being adjustable to selectively position said guidepiece across said cutting path whereby by making a cut along said cutting path with said power saw sais guidepiece may be trimmed along its longitudinal dimension to define a reference edge aligned with said cutting path usable for positioning said saw guide assembly on a workpiece.

13. The invention defined in claim 12, wherein said means for guiding an associated power saw along said housing structure in a straight path comprises:
a guide groove formed in the upper surface of said housing structure to extend longitudinally therealong, said guide groove having a substantially U-shaped cross-section and being open on its ends; and
mating guide structure, said mating guide structure being securable to the base of said associated power saw in a predetermined position relative to the saw blade of said power saw, said mating guide structure being a planar member having a substantially U-shaped cross-section in inverted relationship relative to said guide groove which extends forwardly and rearwardly beyond the base of said associated power saw to ensure proper guidance of said associated power saw during insertion and removal of said guide structure into and from said guide groove; and wherein:
the lower surface of said housing structure is formed as a non-slipping surface to prevent slippage of said assembly on a workpiece or work table.

* * * * *